United States Patent
Wu

(10) Patent No.: US 10,324,219 B2
(45) Date of Patent: Jun. 18, 2019

(54) IDENTIFYING UNCONVENTIONAL FORMATIONS

(71) Applicant: Halliburton Energy Services, Inc., Houston, TX (US)

(72) Inventor: Hsu-Hsiang Wu, Sugar Land, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 346 days.

(21) Appl. No.: 14/440,786

(22) PCT Filed: Mar. 15, 2013

(86) PCT No.: PCT/US2013/032167
§ 371 (c)(1),
(2) Date: May 5, 2015

(87) PCT Pub. No.: WO2014/142982
PCT Pub. Date: Sep. 18, 2014

(65) Prior Publication Data
US 2016/0054468 A1    Feb. 25, 2016

(51) Int. Cl.
*G01V 3/28* (2006.01)
*G01V 99/00* (2009.01)
*G01V 3/38* (2006.01)

(52) U.S. Cl.
CPC ............ *G01V 3/28* (2013.01); *G01V 3/38* (2013.01); *G01V 99/005* (2013.01)

(58) Field of Classification Search
CPC .......... G01V 3/28; G01V 99/005; G01V 3/38
See application file for complete search history.

(56) References Cited

U.S. PATENT DOCUMENTS

| 6,163,155 | A | 12/2000 | Bittar |
| 6,502,036 | B2 | 12/2002 | Zhang et al. |
| 7,382,135 | B2* | 6/2008 | Li .............................. G01V 3/28 |
| | | | 324/338 |
| 7,656,160 | B2 | 2/2010 | Legendre et al. |
| 7,755,361 | B2* | 7/2010 | Seydoux .................. G01V 3/28 |
| | | | 324/333 |

(Continued)

FOREIGN PATENT DOCUMENTS

| CN | 1573013 A | 2/2005 |
| CN | 1580821 A | 2/2005 |

(Continued)

OTHER PUBLICATIONS

Rospatent The Federal State Institute "The Federal Institute for Industrial Property of the Federal Service for Intellectual Property, Patents and Trade Marks" (FSI FIIP), Search Report, Application No. 2015132237/28(049657), entire document, which is a RU counterpart to the instant application; Feb. 15, 2017.

(Continued)

*Primary Examiner* — Huy Q Phan
*Assistant Examiner* — Zannatul Ferdous
(74) *Attorney, Agent, or Firm* — Howard L. Speight, PLLC

(57) ABSTRACT

Signal measurements collected by azimuthally sensitive electromagnetic logging tool as a function of position in a borehole are obtained. The signal measurements are used to identify a type of formation model. An inversion technique appropriate to the type of formation model is applied to the set of signal measurements to determine a geophysical property. The geophysical property is used to make a decision regarding drilling a well.

15 Claims, 17 Drawing Sheets

(56) References Cited

U.S. PATENT DOCUMENTS

| | | |
|---|---|---|
| 7,775,361 B2 | 8/2010 | Ficai |
| 2003/0030439 A1 | 2/2003 | Gao et al. |
| 2003/0051914 A1 | 3/2003 | Bittar |
| 2003/0076107 A1 | 4/2003 | Fanini et al. |
| 2003/0200029 A1 | 10/2003 | Omeragic et al. |
| 2005/0083063 A1 | 4/2005 | Omeragic et al. |
| 2005/0140373 A1 | 6/2005 | Li et al. |
| 2008/0284440 A1* | 11/2008 | Moore ............... G01V 3/24 324/333 |
| 2009/0230968 A1 | 9/2009 | Bittar et al. |
| 2010/0188080 A1* | 7/2010 | Kruspe ............... G01V 3/32 324/303 |
| 2010/0201359 A1* | 8/2010 | Rottengatter ...... G01V 3/32 324/303 |
| 2011/0140701 A1 | 6/2011 | Legendre et al. |
| 2011/0227577 A1* | 9/2011 | Zhang ............... G01V 3/30 324/338 |
| 2013/0046474 A1* | 2/2013 | Bittar ............... G01V 3/10 702/7 |
| 2013/0285665 A1 | 10/2013 | Wu et al. |
| 2016/0274264 A1* | 9/2016 | Wu ............... E21B 47/12 |
| 2016/0363686 A1* | 12/2016 | Kouchmeshky ...... G01V 3/30 |
| 2018/0138992 A1* | 5/2018 | Kraft ............... G01R 29/00 |

FOREIGN PATENT DOCUMENTS

| | | |
|---|---|---|
| CN | 101918863 A | 12/2010 |
| EA | 010951 B1 | 12/2008 |
| RU | 2326414 C1 | 6/2008 |
| WO | 2008076130 A1 | 6/2008 |
| WO | 2008115229 A1 | 9/2008 |
| WO | 2011129828 A1 | 10/2011 |
| WO | 2012121697 A1 | 9/2012 |
| WO | 2014003702 A1 | 1/2014 |

OTHER PUBLICATIONS

The Translation of Rospatent The Federal State Institute "The Federal Institute for Industrial Property of the Federal Service for Intellectual Property, Patents and Trade Marks" (FSI FIIP), Search Report, Application No. 2015132237/28(049657), entire document, which is a RU counterpart to the instant application; Feb. 15, 2017.

Australian Government IP Australia, Notice of Acceptance, Application No. 2013381910, which is an AU counterpart to the instant application, dated May 5, 2016.

Australian Government IP Australia, Patent Examination Report No. 1, Paten Application No. 2013381910, which is an AU counterpart to the instant application, dated Mar. 2, 2016.

The State Intellectual Property Office of the People's Republic of China, Notice of the First Office Action, Application/Patent No. 201380067585.2, which is a CN counterpart to the instant application, dated Dec. 2, 2016.

Translation of the State Intellectual Property Office of the People's Republic of China, Application/Patent No. 201380067585.2, which is a CN counterpart to the instant application, dated Dec. 2, 2016.

International Preliminary Examining Authority, International Preliminary Report on Patentability, International Application No. PCT/US13/32167, which is the PCT parent of the instant application, dated Feb. 19, 2015.

International Searching Authority, Corrected International Search Report and Correct Written Opinion, International Application No. PCT/US13/32167, which is the PCT parent to the instant application, dated Jul. 24, 2013.

International Searching Authority, International Search Report and Written Opinion, International Application No. PCT/US13/32167, which is the PCT parent to the instant application, dated Jun. 11, 2013.

Kyusung Han, Yuri Lee, Dohan Jun, Soonil Lee, Kwang Woo Jung, Sang Sik Yang, Field Emission Ion Source Using a Carbon Nanotube Array for Micro Time-of-Flight Mass Spectrometer, Japanese Journal of Applied Physics 50 (2011), published online Jun. 20, 2011.

Canadian Intellectual Property Office, Examiner's Requisition, Application No. 2,893,852, which is a CA counterpart to the instant application; dated Jun. 22, 2016.

European Patent Office, Extended European Search Report, Application No./Patent No. 13877632.3-1559 / 2926080 PCT/ US2013032167, which is an EP counterpart to the instant application; dated Jun. 7, 2016.

* cited by examiner

IDENTIFYING UNCONVENTIONAL FORMATIONS

BACKGROUND

The basic principles and techniques for electromagnetic (EM) logging for earth formations are well known. For example, induction logging to determine the resistivity (or its inverse, conductivity) of earth formations adjacent a borehole has long been a standard and important technique in the search for and recovery of subterranean petroleum deposits. In brief, a transmitter transmits an electromagnetic signal that passes through formation materials around the borehole and induces a signal in one or more receivers. The amplitude and/or phase of the receiver signals are influenced by the formation resistivity, enabling resistivity measurements to be made. The measured signal characteristics and/or formation properties calculated therefrom are recorded as a function of the tool's depth or position in the borehole, yielding a formation log that can be used by analysts.

EM techniques are used in logging-while-drilling (LWD) and wireline logging. Such techniques are used to evaluate formation parameters, including formation resistivity, formation anisotropy, boundary position, etc.

A parameter (such as resistivity) of a given formation may be isotropic (equal in all directions) or anisotropic (unequal in different directions). Measuring such a parameter in an unconventional formation, containing for example fractures and/or folds, is a challenge.

DETAILED DESCRIPTION

Figure 1:
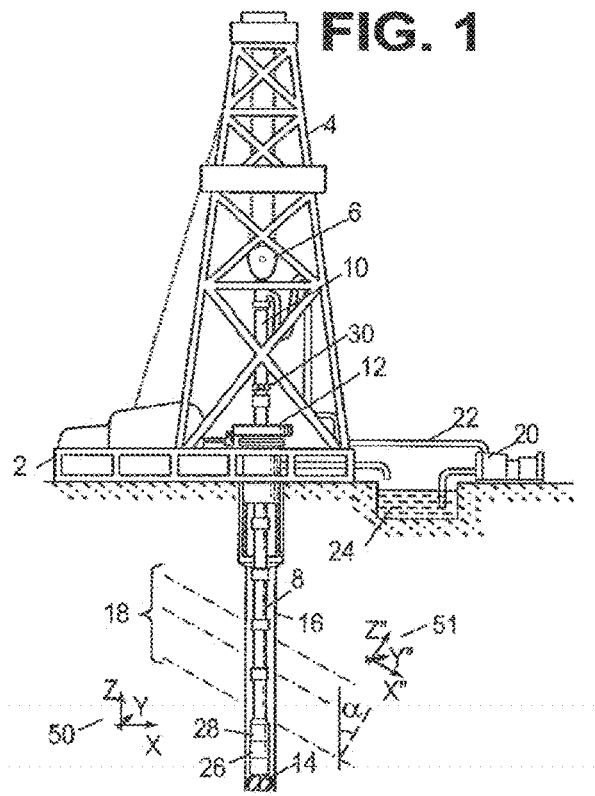
FIG. 1 shows an illustrative logging while drilling environment including dipping formation beds.

The disclosed tool configurations and operations are best understood in the context of the larger systems in which they operate. Accordingly, an illustrative logging while drilling (LWD) environment is shown in FIG. 1. A drilling platform 2 supports a derrick 4 having a traveling block 6 for raising and lowering a drill string 8. A kelly 10 supports the drill string 8 as it is lowered through a rotary table 12. A drill bit 14 is driven by a downhole motor and/or rotation of the drill string 8. As bit 14 rotates, it creates a borehole 16 that passes through various formations 18. A pump 20 circulates drilling fluid through a feed pipe 22 to kelly 10, downhole through the interior of drill string 8, through orifices in drill bit 14, back to the surface via the annulus around drill string 8, and into a retention pit 24. The drilling fluid transports cuttings from the borehole into the pit 24 and aids in maintaining the borehole integrity.

An electromagnetic resistivity logging tool 26 is integrated into the bottom-hole assembly near the bit 14. As the bit extends the borehole through the formations, logging tool 26 collects measurements relating to various formation properties as well as the tool orientation and position and various other drilling conditions. The orientation measurements may be performed using an azimuthal orientation indicator, which may include magnetometers, inclinometers, and/or accelerometers, though other sensor types such as gyroscopes may be used. In some embodiments, the tool includes a 3-axis fluxgate magnetometer and a 3-axis accelerometer. The logging tool 26 may take the form of a drill collar, i.e., a thick-walled tubular that provides weight and rigidity to aid the drilling process. A telemetry sub 28 may be included to transfer tool measurements to a surface receiver 30 and to receive commands from the surface receiver.

More preferably, a rotational position indicator located near the logging tool 26 or the telemetry sub 28 may contain both a 3-axis fluxgate magnetometer and a 3-axis accelerometer. As is known in the art, the combination of those two sensor systems enables the measurement of the toolface, inclination, and azimuth orientation angles of the borehole. The toolface and hole inclination angles are calculated from the accelerometer sensor output. The magnetometer sensor outputs are used to calculate the hole azimuth. With the toolface, the hole inclination, and the hole azimuth information, a tool in accordance with the present invention can be used to steer the bit to the desirable bed. Specifically, the response difference or the response ratio can be used effectively to enter a desired payzone or to stay within the payzone of interest.

Figure 2:
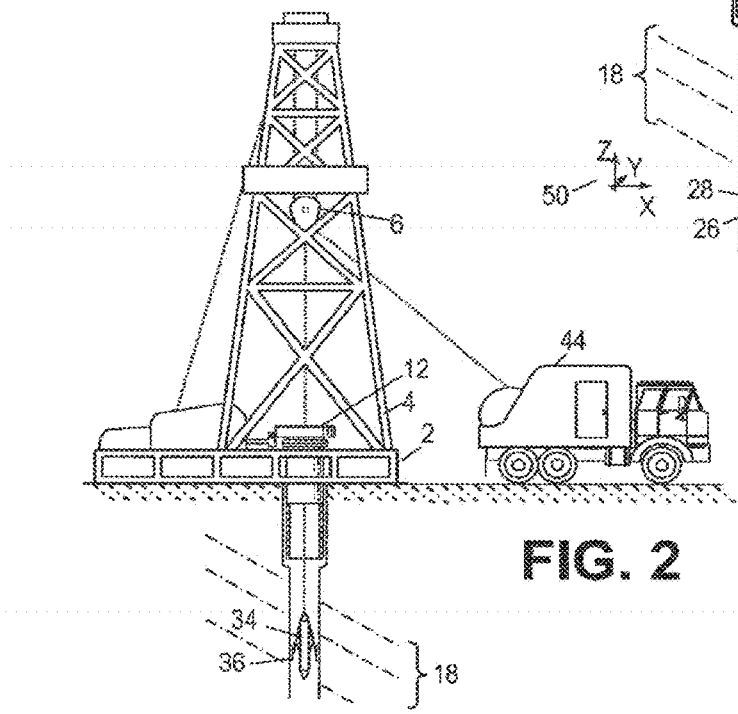
FIG. 2 shows an illustrative wireline logging environment including dipping formation beds.

At various times during the drilling process, the drill string 8 may be removed from the borehole as shown in FIG. 2. Once the drill string has been removed, logging operations can be conducted using a wireline logging tool 34, i.e., a sensing instrument sonde suspended by a cable 42 having conductors for transporting power to the tool and telemetry from the tool to the surface. A resistivity imaging portion of the logging tool 34 may have centralizing arms 36 that center the tool within the borehole as the tool is pulled uphole. A logging facility 44 collects measurements from the logging tool 34, and includes computing facilities for processing and storing the measurements gathered by the logging tool.

Figure 3:
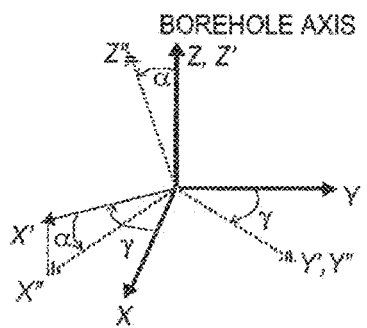
FIG. 3 shows a relationship between the orientation of a borehole and a dipping formation bed.

The formations 18 shown in FIG. 1 are not perpendicular to the borehole, which may occur naturally or due to directional drilling operations. The borehole may have a coordinate system 50 defined in accordance with the borehole's long axis (the z axis) and the north side (or alternatively, the high side) of the hole (the x-axis). The formations 18, when characterized as a plane, may have a coordinate system 51 defined in accordance with the normal to the plane (the z" axis) and the direction of steepest descent (the x"-axis). As shown in FIG. 3, the two coordinate systems are related by two rotations. Beginning with the borehole's coordinate system (x, y, z), a first rotation of angle γ is made about the z axis. The resulting coordinate system is denoted (x', y', z'). Angle γ is the relative strike angle, which indicates the direction of the formation dip relative to the borehole's coordinate system. A second rotation of angle α is then made about the y' axis. This aligns the borehole coordinate system with the formation coordinate system. Angle α is the relative dip angle, which is the slope angle of the beds relative to the long axis of the borehole.

The vertical resistivity is generally found to be the resistivity as measured perpendicular to the plane of the formation, and the horizontal resistivity is the resistivity as measured within the plane of the formation. Determination of each of these parameters (dip angle, strike angle, vertical resistivity, and horizontal resistivity) is desirable.

Figure 4:
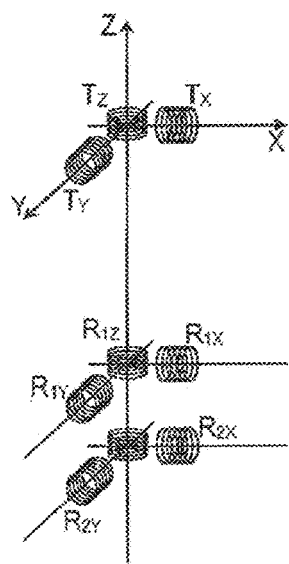
FIG. 4 shows a hypothetical antenna arrangement for a tool having an orthogonal triaxial transmitter and two orthogonal triaxial receivers.

FIG. 4 shows a hypothetical antenna configuration for a multi-component electromagnetic resistivity logging tool. The electromagnetic resistivity logging tool may be embodied as a wireline tool and as a logging while drilling tool. A triad of transmitter coils $T_X$, $T_Y$ and $T_Z$, each oriented along a respective axis, is provided. At least one triad of similarly oriented receiver coils $R_{1X}$, $R_{1Y}$, and $R_{1Z}$ is also provided. For receive signal measurements relative to the amplitude and phase of the transmit signal (sometimes called "absolute" measurements), only one receiver triad would be used. A second triad of similarly oriented receiver coils pairs $R_{2X}$, $R_{2Y}$, and $R_{2Z}$ may also provided when differential measurements are desired (e.g., a signal amplitude ratio or a phase difference between receiver coils oriented along a given axis). Differential measurements may offer increased spatial resolution.

Moran and Gianzero, in "Effects of Formation Anisotropy on Resistivity Logging Measurements" Geophysics, Vol. 44, No. 7, p. 1266 (1979), noted that the magnetic field h in the receiver coils can be represented in terms of the magnetic moments m at the transmitters and a coupling matrix C:

$$h = Cm \quad (1)$$

In express form, equation (1) is:

$$\begin{bmatrix} H_x \\ H_y \\ H_z \end{bmatrix} = \begin{bmatrix} C_{xx} & C_{xy} & C_{xz} \\ C_{yx} & C_{yy} & C_{yz} \\ C_{zx} & C_{zy} & C_{zz} \end{bmatrix} \begin{bmatrix} M_x \\ M_y \\ M_z \end{bmatrix} \quad (2)$$

where $M_X$, $M_Y$, and $M_Z$ are the magnetic moments (proportional to transmit signal strength) created by transmitters $T_X$, $T_Y$, and $T_Z$, respectively. $H_X$, $H_Y$, $H_Z$ are the magnetic fields (proportional to receive signal strength) at the receiver antennas $R_X$, $R_Y$, and $R_Z$, respectively.

In the antenna configuration of FIG. 4, if each transmitter is fired in turn, and signal measurements are made at each receiver in response to each firing, nine absolute or differential measurements are obtained. These nine measurements enable the determination of a complete coupling matrix C. ($C_{IJ} = a_{IJ} V_I^J$, where I is the index for receiver $R_X$, $R_Y$, or $R_Z$, J is the index for transmitter $T_X$, $T_Y$, or $T_Z$, $a_{IJ}$ is a constant determined by the tool design, and $V_I^J$ is a complex value representing in the signal amplitude and phase shift measured by receiver I in response to the firing of transmitter J.) Knowledge of the complete coupling matrix enables the determination of dip angle, strike angle, vertical resistivity, and horizontal resistivity. A number of techniques may be used to determine these parameters. For example, dip and strike angle may be determined from coupling matrix values as explained by Li Gao and Stanley Gianzero, U.S. Pat. No. 6,727,706 entitled "Virtual Steering of Induction Tool for Determination of Formation Dip Angle". Given these angles, vertical and horizontal resistivity can be determined in accordance with equations provided by Michael Bittar, U.S. Pat. No. 7,019,528 entitled "Electromagnetic Wave Resistivity Tool Having a Tilted Antenna for Geosteering within a Desired Payzone". Alternatively, a simultaneous solution for these parameters may be found as described in the Bittar reference.

Figure 5:
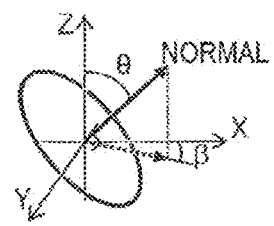
FIG. 5 shows angles for defining the orientation of a tilted antenna.

FIG. 5 shows two angles that may be used to specify the orientation of a coil antenna. The coil antenna may be considered as residing in a plane having a normal vector. Tilt angle θ is the angle between the longitudinal axis of the tool and the normal vector. Azimuth angle β is the angle between the projection of the normal vector in the X-Y plane and the tool scribe line. Alternatively, in the downhole context, azimuthal angle β may represent the angle between projection of the normal vector in the X-Y plane and the x-axis of the borehole coordinate system.

It is noted that three transmitter antenna orientations and three receiver antenna orientations are employed in the antenna configuration of FIG. 4. It has been discovered, as described in Michael Bittar and Guoyu Hu, WO2008/076130, entitled "Antenna Coupling Component Measurement Tool Having Rotating Antenna Configuration," that when tool rotation is exploited, it is possible to determine the full coupling matrix with only one transmitter and two receiver antenna orientations (or equivalently, one receiver and two transmitter antenna orientations). Moreover, with certain assumptions about the configuration of the formation, one transmitter and receiver antenna orientation may be sufficient.

Figure 6:
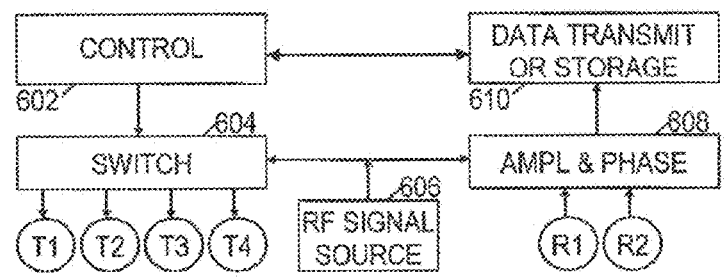
FIG. 6 is a block diagram of an illustrative electronics module for an electromagnetic resistivity tool.

Before considering various tools having specific antenna configurations, the electronics common to each tool are described. FIG. 6 shows a functional block diagram of the electronics for a resistivity tool. The electronics include a control module 602 that is coupled to an analog switch 604. Analog switch 604 is configured to drive any one of the transmitter coils $T_1$, $T_2$, $T_3$, $T_4$ with an alternating current (AC) signal from a signal source 606. In some embodiments, the signal source provides radio frequency signals. The control module 602 preferably selects a transmitter coil, pauses long enough for transients to die out, then signals data storage/transmit module 610 to accept an amplitude and phase sample of the signals received by each of the receivers. The control module 602 preferably repeats this process sequentially for each of the transmitters. The amplitude and phase shift values are provided by amplitude and phase shift detector 608 which is coupled to each of the receiver coils $R_1$ and $R_2$ for this purpose.

Control module 602 may process the amplitude and phase shift measurements to obtain compensated measurements and/or measurement averages. The raw, compensated, or averaged measurements may be transmitted to the surface for processing to determine dip and strike angles, vertical and horizontal resistivity, and other information such as (i) distance to nearest bed boundary, (ii) direction of nearest bed boundary, and (iii) resistivity of any nearby adjacent beds. The data storage/transmitter module 610 may be coupled to telemetry unit 28 (FIG. 1) to transmit signal measurements to the surface. Telemetry unit 28 can use any of several known techniques for transmitting information to the surface, including but not limited to (1) mud pressure pulse; (2) hard-wire connection; (3) acoustic wave; and (4) electromagnetic waves.

Figure 7:
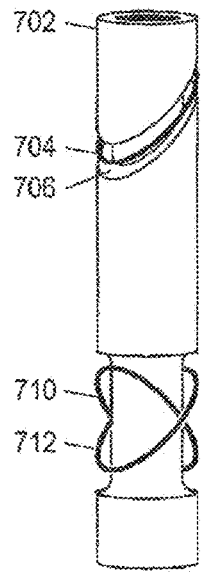
FIG. 7 shows an illustrative electromagnetic resistivity logging tool having tilted transmitter and receiver antennas.

FIG. 7 shows an electromagnetic resistivity logging tool 702 having only two receiver antenna orientations. The tool 702 is provided with one or more regions 706 of reduced diameter. A wire coil 704 is placed in the region 706 and in some embodiments is spaced away from the surface of subassembly 702 by a constant distance. To mechanically support and protect the coil 704, a non-conductive filler material (not shown) such as epoxy, rubber, or ceramic may be used in the reduced diameter regions 706. Coil 704 is a transmitter coil, and coils 710 and 712 are receiving coils. In operation, transmitter coil 704 transmits an interrogating electromagnetic signal which propagates through the borehole and surrounding formation. Receiver coils 710, 712 detect the interrogating electromagnetic signal and provide a measure of the electromagnetic signal's amplitude attenuation and phase shift. For differential measurements additional receiver coils parallel to coils 710, 712 may be provided at an axially-spaced distance. From the absolute or differential amplitude attenuation and phase shift measurements, the coupling matrix components can be determined and used as the basis for determining formation parameters and as the basis for geosteering.

The transmitter coil 704 may be spaced approximately 30 inches from the receiver coils 710, 712. The transmitter and receiver coils may comprise as little as one loop of wire, although more loops may provide additional signal power. The distance between the coils and the tool surface is preferably in the range from 1/16 inch to 3/4 inch, but may be larger. Transmitter coil 704 and receiver coil 712 may each have a tilt angle of about 45° and aligned with the same azimuth angle, while receiver coil 710 may have a tilt angle of about 45° and an azimuth 180° apart from receiver coil 712 (or equivalently, a tilt angle of minus 45° at the same azimuth angle as receiver coil 712).

Figure 8:
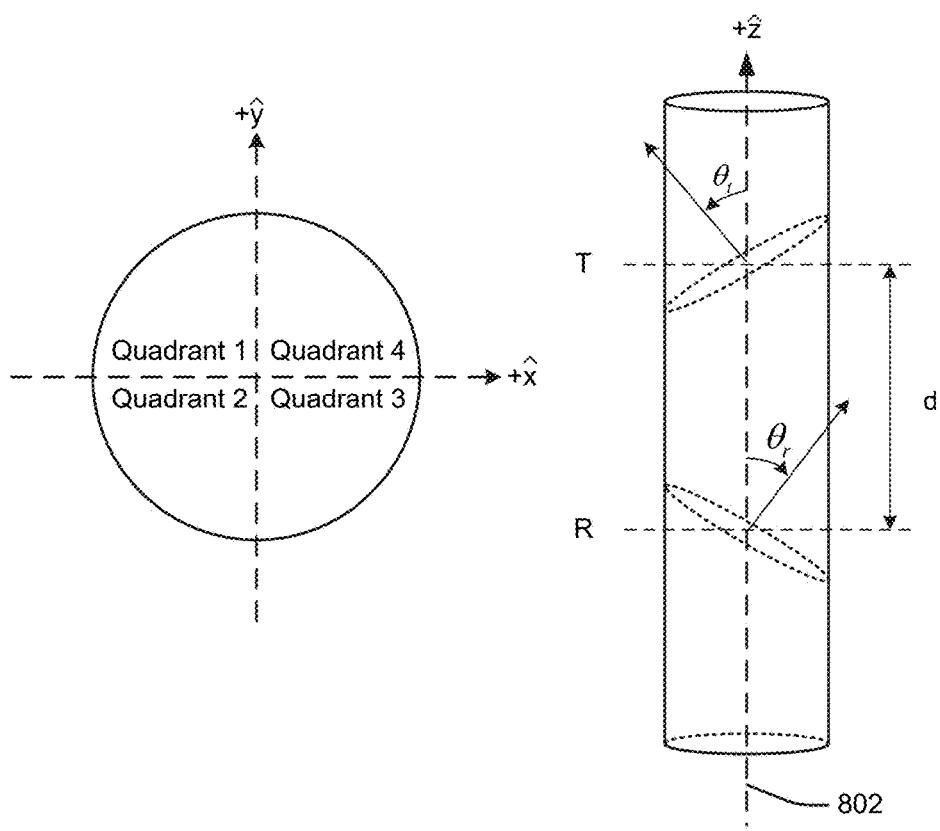
FIG. 8 illustrates an antenna arrangement.

The signal measured by a tilted receiver in response to the firing of a tilted transmitter can be expressed in terms of the signals $V_R^T$ that would be measured by the tool of FIG. 4. One embodiment of an antenna configuration, illustrated in FIG. 8, includes a tilted transmitter (T) and a tilted transmitter (R). When both the transmitter and receiver are oriented at the same azimuth angle $\beta$, the tilted receiver signal $V_R^T$ is:

$$V_R^T(\beta) = \begin{bmatrix} \sin\theta_t\cos\beta \\ \sin\theta_t\sin\beta \\ \cos\theta_t \end{bmatrix}^T \begin{bmatrix} v_x^x & v_y^x & v_z^x \\ v_x^y & v_y^y & v_z^y \\ v_x^z & v_y^z & v_z^z \end{bmatrix} \begin{bmatrix} \sin\theta_r\cos\beta \\ \sin\theta_r\sin\beta \\ \cos\theta_r \end{bmatrix} \quad (3)$$

Figure 9:
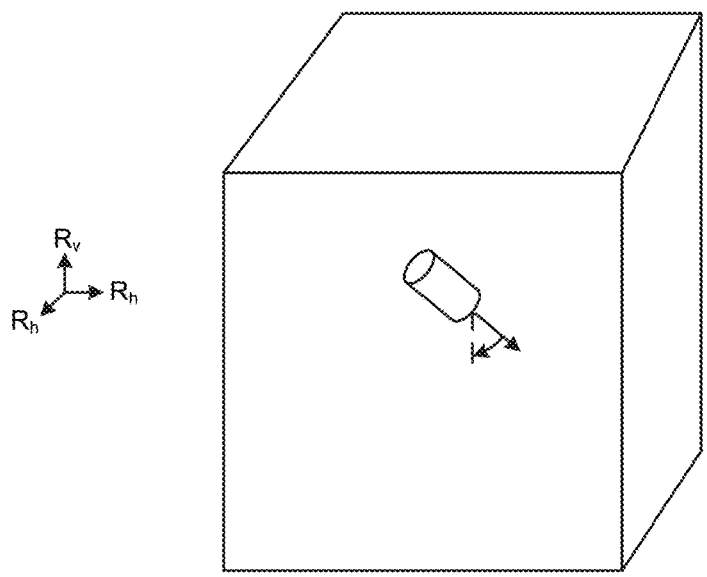
FIGS. 9 and 10 illustrate conventional formation models.

Where, $\theta_t$ is the tilt angle of the transmitter relative to the z-axis (line 802 in FIG. 8), $\theta_r$ is the tilt angle of the receiver relative to the z-axis direction, $v_I^J$ is a complex value representing the signal amplitude and phase shift measured by the receiver in I-directional dipole in response to the firing of transmitter in J-directional dipole. The tilted receiver signal $V_R^T$ can be a measurement of a voltage or of an electromagnetic field. Equation (3) can be also expressed as:

$$V_R^T(\beta) = \left[\left(\frac{C_{xx}-C_{yy}}{2}\right)\cos2\beta + \left(\frac{C_{yx}+C_{xy}}{2}\right)\sin2\beta\right] + \\ [(C_{zx}+C_{xz})\cos\beta + (C_{zy}+C_{yz})\sin\beta] + \left(C_{zz}+\frac{C_{xx}}{2}+\frac{C_{yy}}{2}\right) \quad (4)$$

where:
$C_{xx}=v_x^x \sin\theta_t \sin\theta_r$; $C_{yx}=v_x^y \sin\theta_t \sin\theta_r$; $C_{zx}=v_x^z \cos\theta_t \sin\theta_r$
$C_{xy}=v_y^x \sin\theta_t \sin\theta_r$; $C_{yy}=v_y^y \sin\theta_t \sin\theta_r$; $C_{zy}=v_y^z \cos\theta_t \sin\theta_r$
$C_{xz}=v_z^x \sin\theta_t \cos\theta_r$; $C_{yz}=v_z^y \sin\theta_t \cos\theta_r$; $C_{zz}=v_z^z \cos\theta_t \cos\theta_r$ FIG. 9 illustrates a conventional formation model where homogeneous isotropic or transversely isotropic (TI) formation medium is considered. For a TI medium, a formation electrical property (i.e., formation resistivity) in the horizontal plane is different than a formation electrical property in the vertical plane. As indicated in FIG. 9, the horizontal plane has same resistivity profile (horizontal resistivity, $R_h$) in all horizontal directions and a vertical resistivity profile (vertical resistivity, $R_v$) in the vertical direction. An isotropic formation is described if $R_v$ equals $R_h$, and an anisotropic formation model is defined if $R_v$ is not equal to $R_h$.

Figure 10:
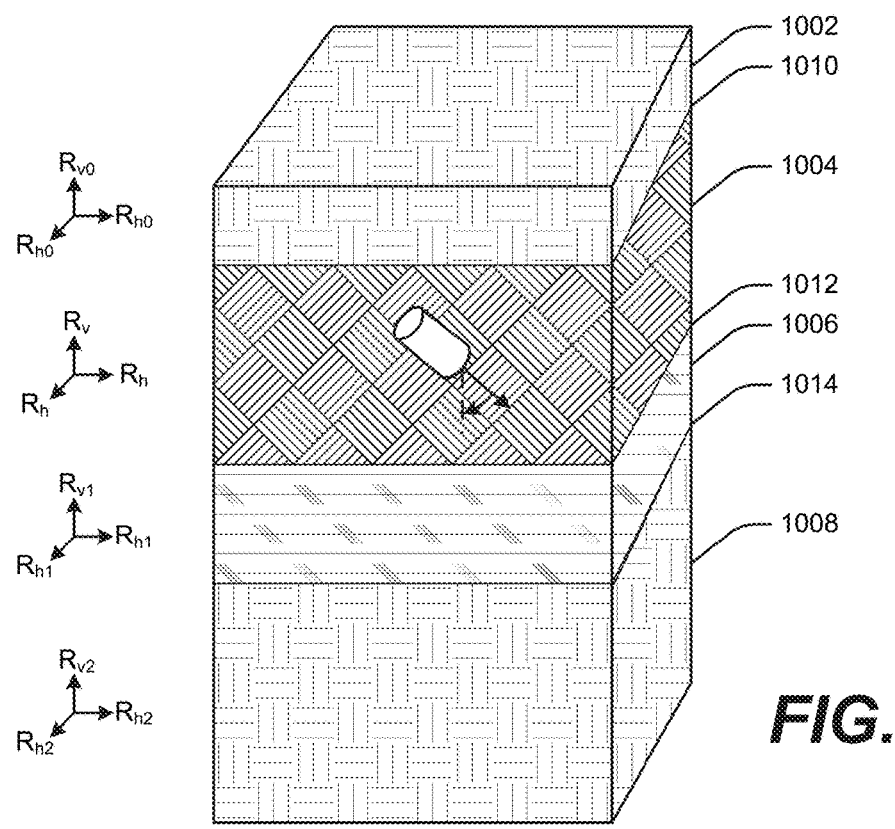

Another conventional formation model, illustrated in FIG. 10, consists of inhomogeneous layered formations 1002, 1004, 1006, 1008 with TI media in each layer and parallel boundaries 1010, 1012, 1014 between each layer.

Figure 11A:
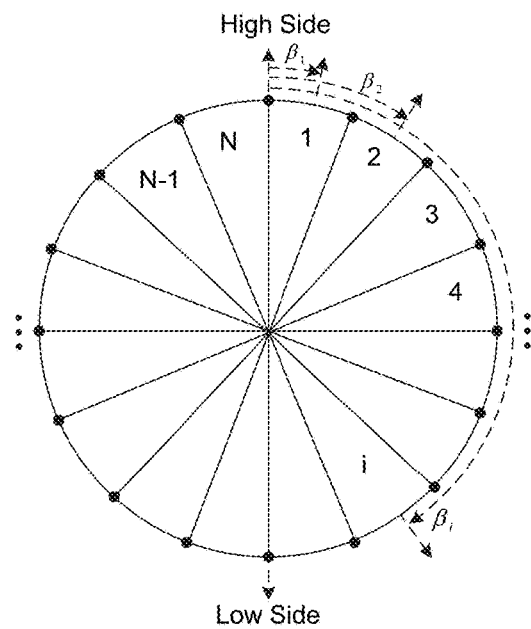
FIG. 11A illustrates bins.

During logging, in one embodiment, control module 602 sorts samples according to the orientation of the tool when the sample was taken into N bins, such as those illustrated in FIG. 11A, each bin centered at $\beta_i$ degrees relative to the high side of the tool.

With conventional formation models such as those in FIGS. 9 and 10, Eq. (2) can be simplified as:

$$V_R^T(\beta_i) = \begin{bmatrix} \sin\theta_t\cos\beta_i \\ \sin\theta_t\sin\beta_i \\ \cos\theta_t \end{bmatrix}^T \begin{bmatrix} v_x^x & 0 & v_z^x \\ 0 & v_y^y & 0 \\ v_x^z & 0 & v_z^z \end{bmatrix} \begin{bmatrix} \sin\theta_r\cos\beta_i \\ \sin\theta_r\sin\beta_i \\ \cos\theta_r \end{bmatrix} \quad (5)$$

$$= \left(\frac{C_{xx}-C_{yy}}{2}\right)\cos2\beta_i + (C_{zx}+C_{xz})\cos\beta_i + \frac{2C_{zz}+C_{xx}+C_{yy}}{2}$$

$$= A_{double}(\beta_i) + A_{single}(\beta_i) + A_{const}$$

where:
$\beta_i$ is azimuth angle corresponding to the bin direction i in FIG. 11A, $$A_{double}(\beta_i) = \left(\frac{C_{xx}-C_{yy}}{2}\right)\cos2\beta_i,$$

$$A_{single}(\beta_i) = (C_{zx}+C_{xz})\cos\beta_i, \text{ and}$$

$$A_{const} = \frac{2C_{zz}+C_{xx}+C_{yy}}{2}.$$

Figure 11B:
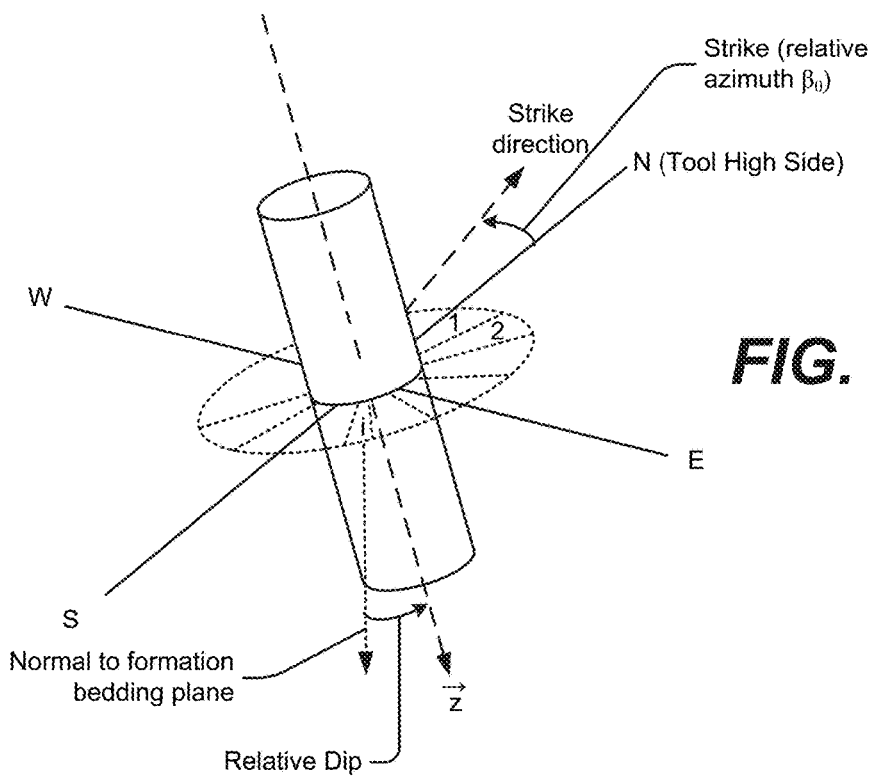
FIG. 11B illustrates mathematical relationships between the bins and the formation from which data is being collected.

In practice, $\beta_i$ is a tool azimuth angle relative to a tool high side direction, as illustrated in FIG. 11B. The tool's "high side" is normally a magnetic north direction determined by a magnetometer device or as upward direction determined by a gravity-sensing device. FIG. 11B also illustrates the relationship between a formation strike direction (i.e., a direction along a line representing an intersection of a formation bedding plane with a horizontal plane) and the tool high side. The cosine wave signals in equation (5) (i.e., $A_{double}$ and $A_{single}$) can be used to calculate strike angle $\beta_0$ (or relative azimuth, the angle between the tool's high side and the formation strike direction) by examining the azimuth shift in the tool azimuth spectrum. Further, FIG. 11B illustrates the relative dip angle defined by the angle between the tool's drilling direction (i.e., the "z" direction) and a direction normal to the formation bedding plane.

Figure 12:
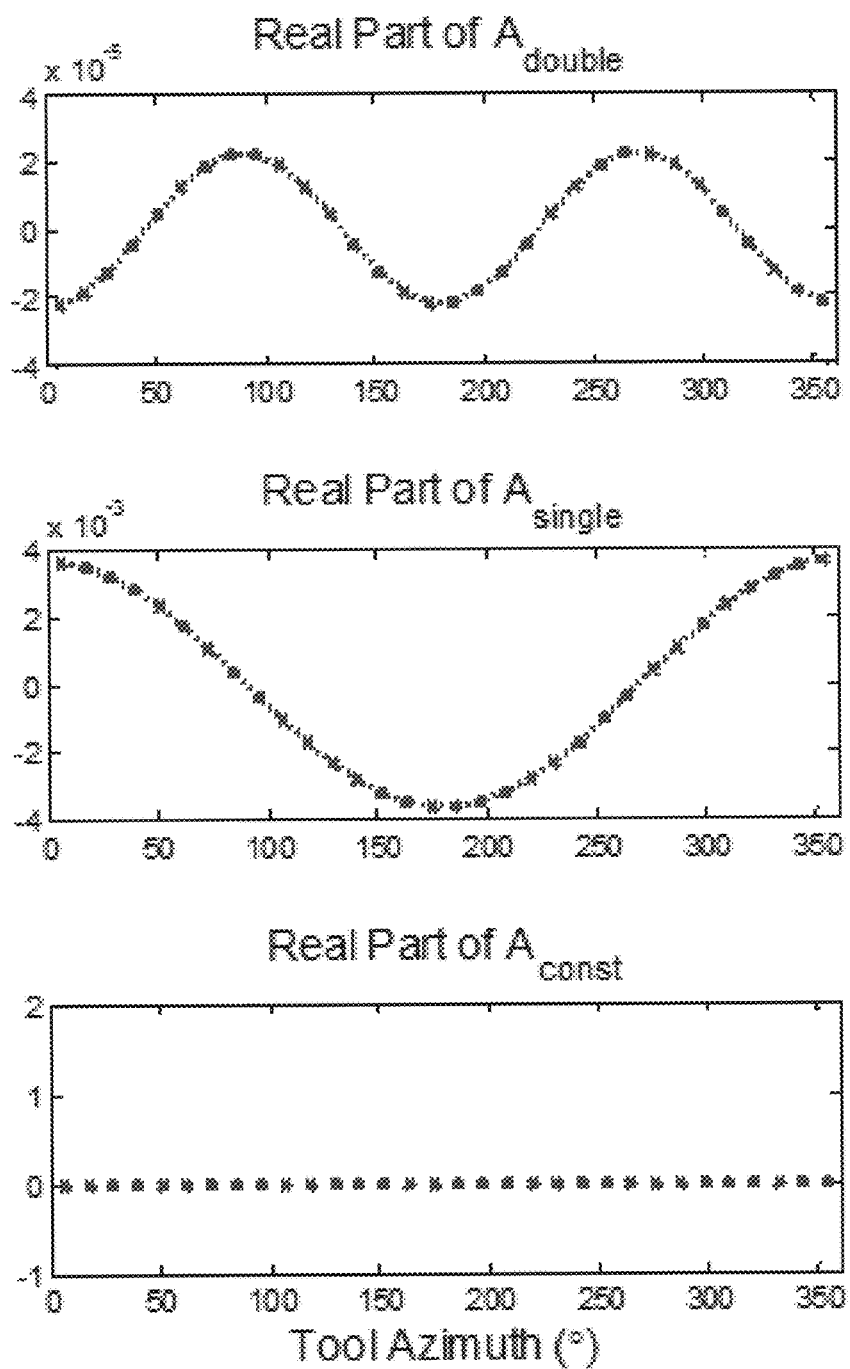
FIGS. 12-15, and 18-19 illustrate modeling responses.
Figure 13:
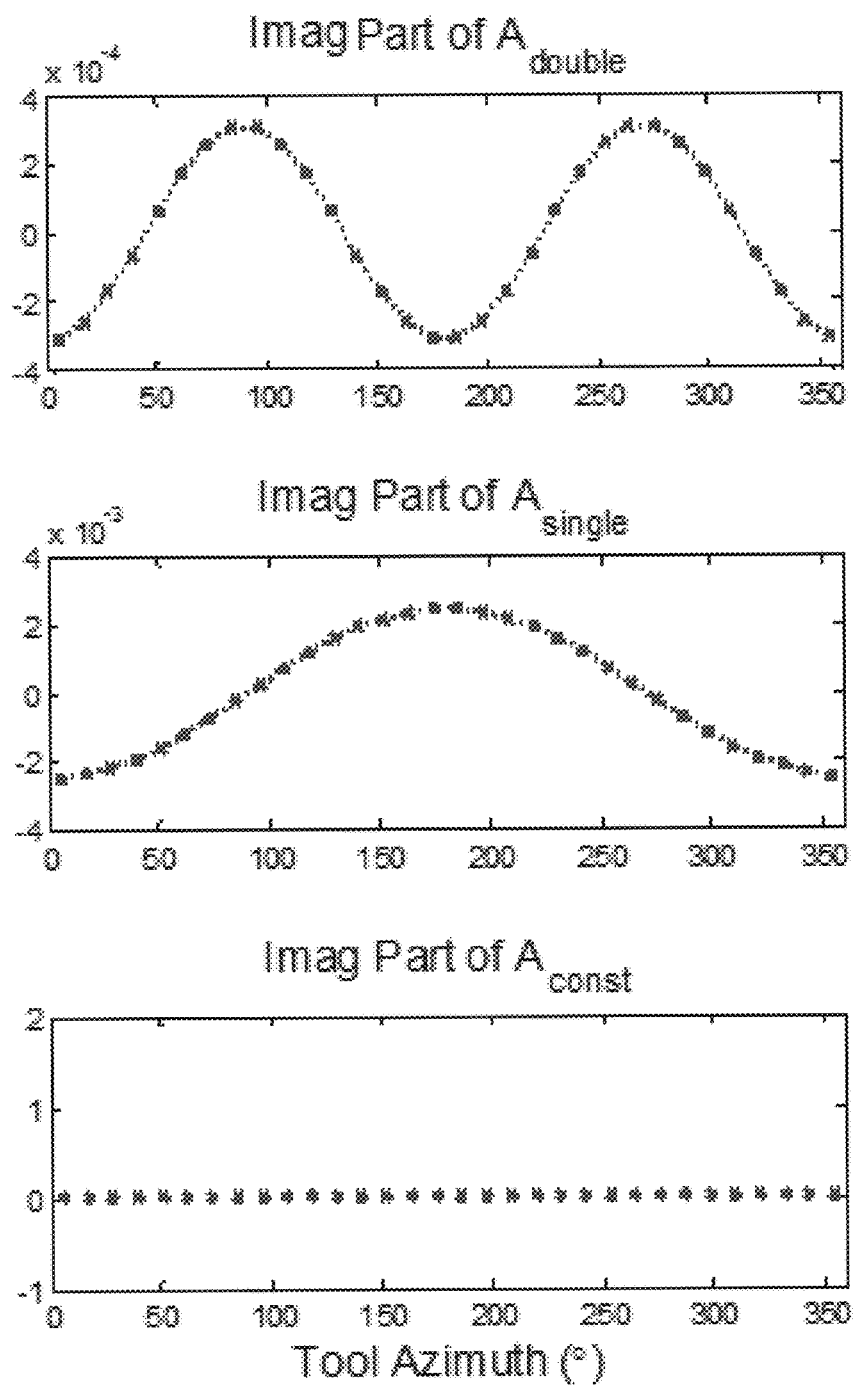
Figure 14:
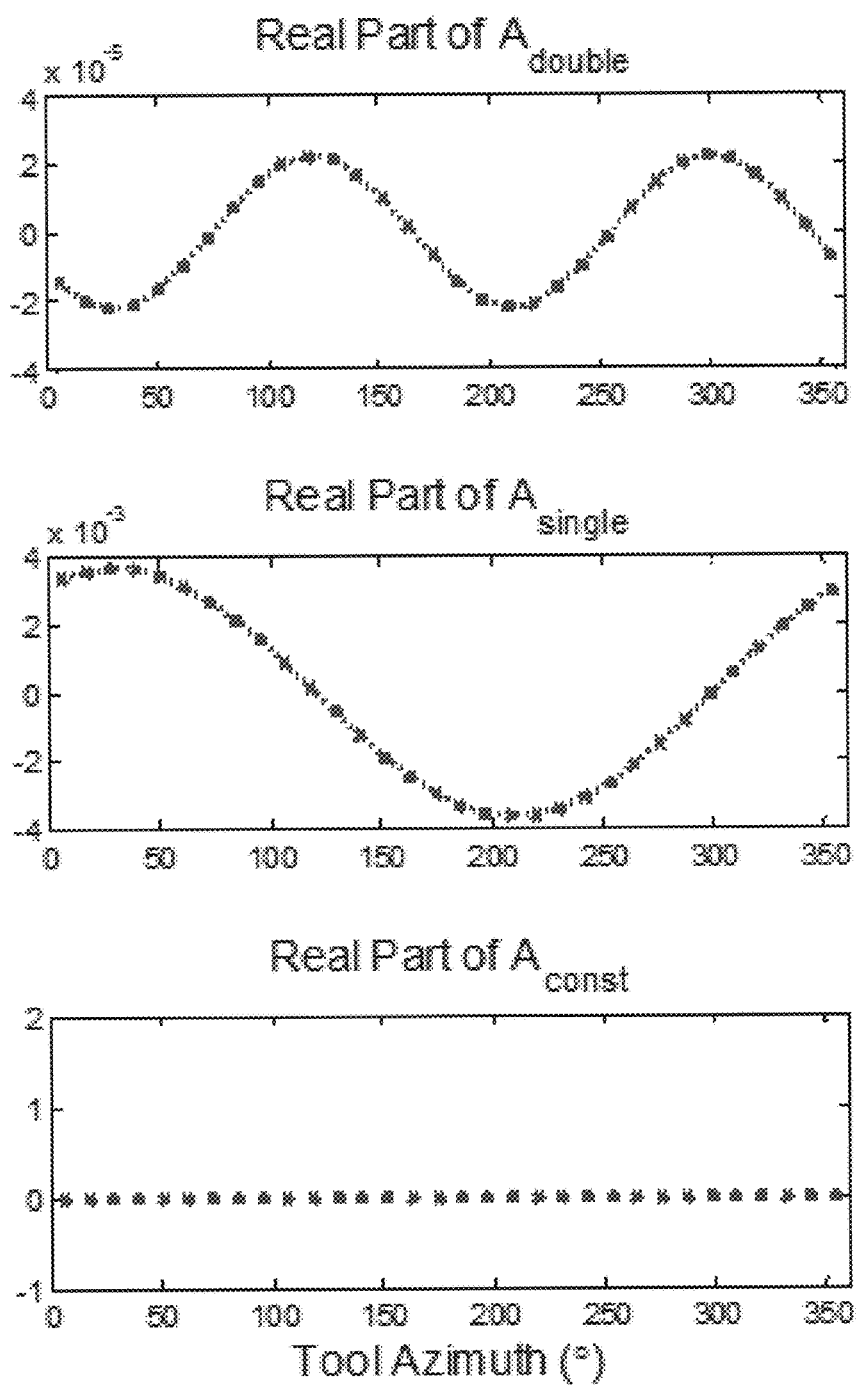
Figure 15:
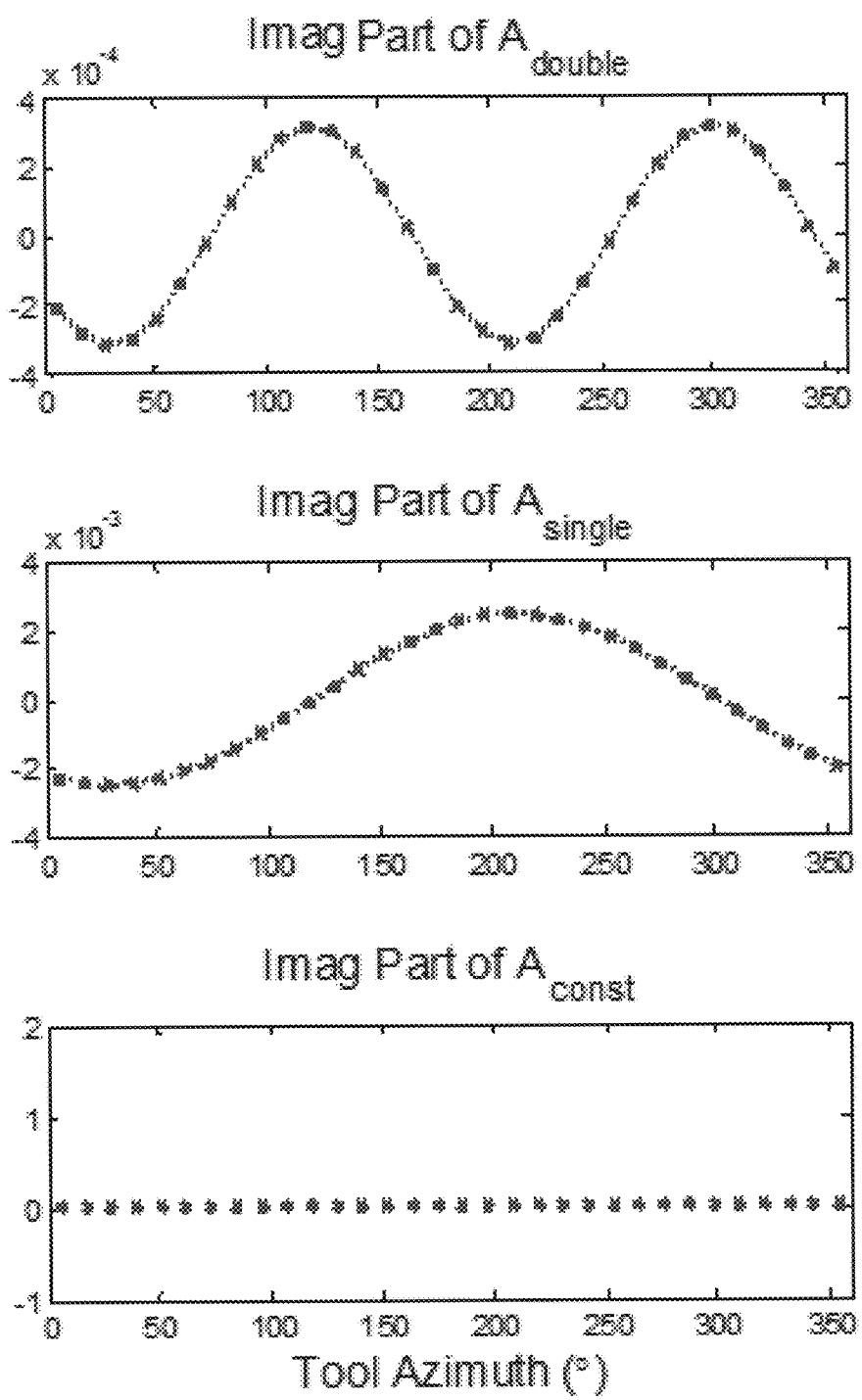

Equation (5) includes three types of signals with respect to tool azimuthal angle $\beta_i$:

(1) a cosine wave signal with double periods ($A_{double}$ ($\beta_i$)), (2) a cosine wave signal with a single period ($A_{single}$ ($\beta_i$)), and (3) a constant signal ($A_{const}$) regardless of tool azimuth. These three signals are all complex numbers consisting of a real part and an imaginary part. Consequently, Eq. (5) indicates that both real part and imaginary part of the cosine wave should have same shift in azimuth angle. FIGS. 12 and 13 illustrate tool azimuth spectra modeling responses of an antenna structure such as that shown in FIG. 8 (d=44 inch, $\theta_t$=45°=$\theta_r$, operation frequency of 125 kHz) in a conventional formation model (Rh=0.62 Ω·m, Rh=1.68 Ω·m, relative dip angle of 20°, and strike angle of 0°). As shown in FIGS. 12 and 13, the real part and imaginary part for each type of sinusoidal signals have the same shift in azimuth angle (that is, a peak in the real and imaginary parts of $A_{double}$ and a peak in the real and imaginary parts of $A_{single}$ occurs at 0°, indicating a strike angle of 0°). FIGS. 14 and 15 present the same modeling responses but with a defined formation model as in FIG. 9 or 10 with a 30° azimuth shift away from the tool. In this situation, the real part and imaginary part of each type of sinusoidal wave present the same azimuth shift (that is, a peak in the real and imaginary parts of $A_{double}$ and a peak in the real and imaginary parts of $A_{single}$ occurs at 30°) (described in Eq. (5)). The real and imaginary parts of $A_{double}$ and $A_{single}$ present the same azimuth shift in tool azimuth spectrum, indicating the true strike angle of the formation bedding structure.

Figure 16:
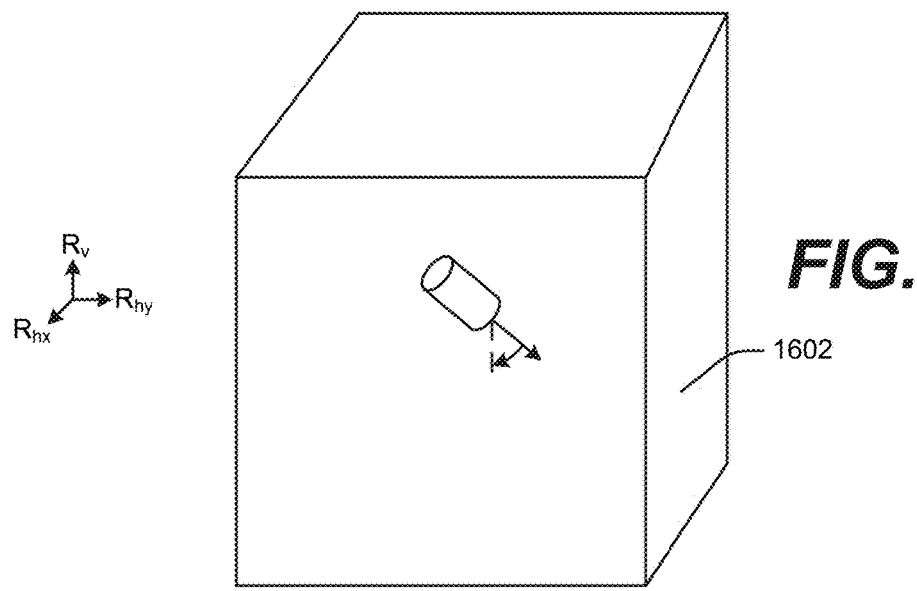
FIGS. 16 and 17 illustrate unconventional formation models.
Figure 17:
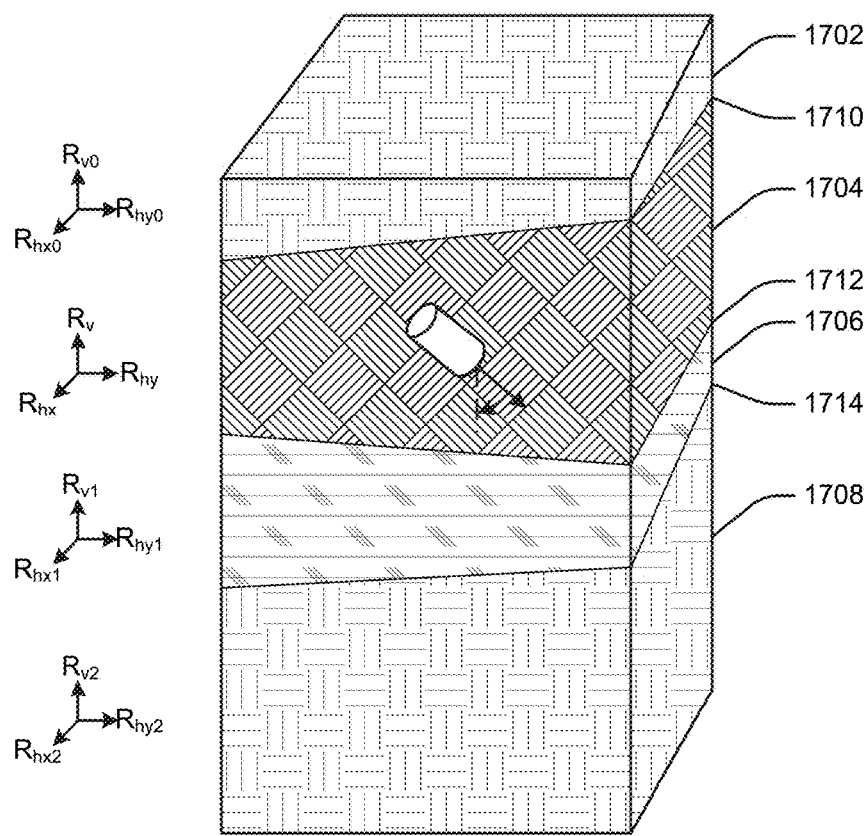

Equation (5) is not valid if the tool is located in an unconventional formation model such as those illustrated in FIGS. 16 and 17. Instead of a TI medium, FIG. 16 shows an unconventional formation model consisting of two resistivity profiles in the horizontal plane ($R_{hx}$ and $R_{hy}$). The unconventional formation 1602 illustrated in FIG. 16 has three individual resistivity profiles in triaxial directions, where $R_{hx}$ and $R_{hy}$ are located in horizontal plane in x and y direction, respectively, and $R_v$ indicating the vertical resistivity in the z direction. Such an unconventional model is defined as biaxial anisotropic formation.

FIG. 17 illustrates an unconventional layered formation model with layers 1702 (having resistivity profile $R_{hx0}$, $R_{hy0}$ in the horizontal plane and $R_{v0}$ in the vertical plane), 1704 (having resistivity profile $R_{hx}$, $R_{hy}$ in the horizontal plane and $R_v$ in the vertical plane), 1706 (having resistivity profile $R_{hx1}$, $R_{hy1}$ in the horizontal plane and $R_{v1}$ in the vertical plane), and 1708 (having resistivity profile $R_{hx2}$, $R_{hy2}$ in the horizontal plane and $R_{v2}$ in the vertical plane) and with non-parallel boundaries 1710, 1712, 1714 between the layer.

With such unconventional formation models, such as shown in FIGS. 16 and 17, equation (5) is no long valid and equation (4) can be expressed as:

$$V_R^T(\beta_i) = \begin{bmatrix} \sin\theta_t\cos\beta_i \\ \sin\theta_t\sin\beta_i \\ \cos\theta_t \end{bmatrix}^T \begin{bmatrix} v_x^x & v_y^x & v_z^x \\ v_x^y & v_y^y & v_z^y \\ v_x^z & v_y^z & v_z^z \end{bmatrix} \begin{bmatrix} \sin\theta_r\cos\beta_i \\ \sin\theta_r\sin\beta_i \\ \cos\theta_r \end{bmatrix} \quad (6)$$

$$= \left[\left(\frac{C_{xx}-C_{yy}}{2}\right)\cos 2\beta_i + \left(\frac{C_{yx}+C_{xy}}{2}\right)\sin 2\beta_i\right] +$$

$$[(C_{zx}+C_{xz})\cos\beta_i + (C_{zy}+C_{yz})\sin\beta_i] + \frac{2C_{zz}+C_{xx}+C_{yy}}{2}$$

$$= A_{double}(\beta_i) + A_{single}(\beta_i) + A_{const}$$

where:

$$A_{double}(\beta_i) = \left(\frac{C_{xx}-C_{yy}}{2}\right)\cos 2\beta_i + \left(\frac{C_{yx}+C_{xy}}{2}\right)\sin 2\beta_i \quad (7a)$$

$$A_{single}(\beta_i) = (C_{zx}+C_{xz})\cos\beta_i + (C_{zy}+C_{yz})\sin\beta_i \quad (7b)$$

$$A_{const} = \frac{2C_{zz}+C_{xx}+C_{yy}}{2} \quad (7c)$$

Equations (7a) and 7(b) can be expressed as:

$$A_{double}(\beta_i) = A_{DR}\cos(2\beta_i-\beta_{DR}) + i \times A_{DI}\cos(2\beta_i-\beta_{SI}) \quad (8a)$$

$$A_{single}(\beta_i) = A_{SR}\cos(2\beta_i-\beta_{SR}) + i \times A_{SI}\cos(2\beta_i-\beta_{SI}) \quad (8b)$$

where:

$$\begin{cases} A_{DR} = \sqrt{\left(\text{real}\left\{\frac{C_{xx}-C_{yy}}{2}\right\}\right)^2 + \left(\text{real}\left\{\frac{C_{yx}+C_{xy}}{2}\right\}\right)^2}, & \beta_{DR} = \tan^{-1}\left(\text{real}\left\{\frac{C_{yx}+C_{xy}}{C_{xx}-C_{yy}}\right\}\right) \\ A_{DI} = \sqrt{\left(\text{imag}\left\{\frac{C_{xx}-C_{yy}}{2}\right\}\right)^2 + \left(\text{imag}\left\{\frac{C_{yx}+C_{xy}}{2}\right\}\right)^2}, & \beta_{DI} = \tan^{-1}\left(\text{imag}\left\{\frac{C_{yx}+C_{xy}}{C_{xx}-C_{yy}}\right\}\right) \\ A_{SR} = \sqrt{(\text{real}\{C_{zx}+C_{xz}\})^2 + (\text{real}\{C_{zy}+C_{yz}\})^2}, & \beta_{SR} = \tan^{-1}\left(\text{real}\left\{\frac{C_{zy}+C_{yz}}{C_{zx}+C_{xz}}\right\}\right) \\ A_{SI} = \sqrt{(\text{imag}\{C_{zx}+C_{xz}\})^2 + (\text{imag}\{C_{zy}+C_{yz}\})^2}, & \beta_{SI} = \tan^{-1}\left(\text{imag}\left\{\frac{C_{zy}+C_{yz}}{C_{zx}+C_{xz}}\right\}\right) \end{cases} \quad (9)$$

Figure 18:
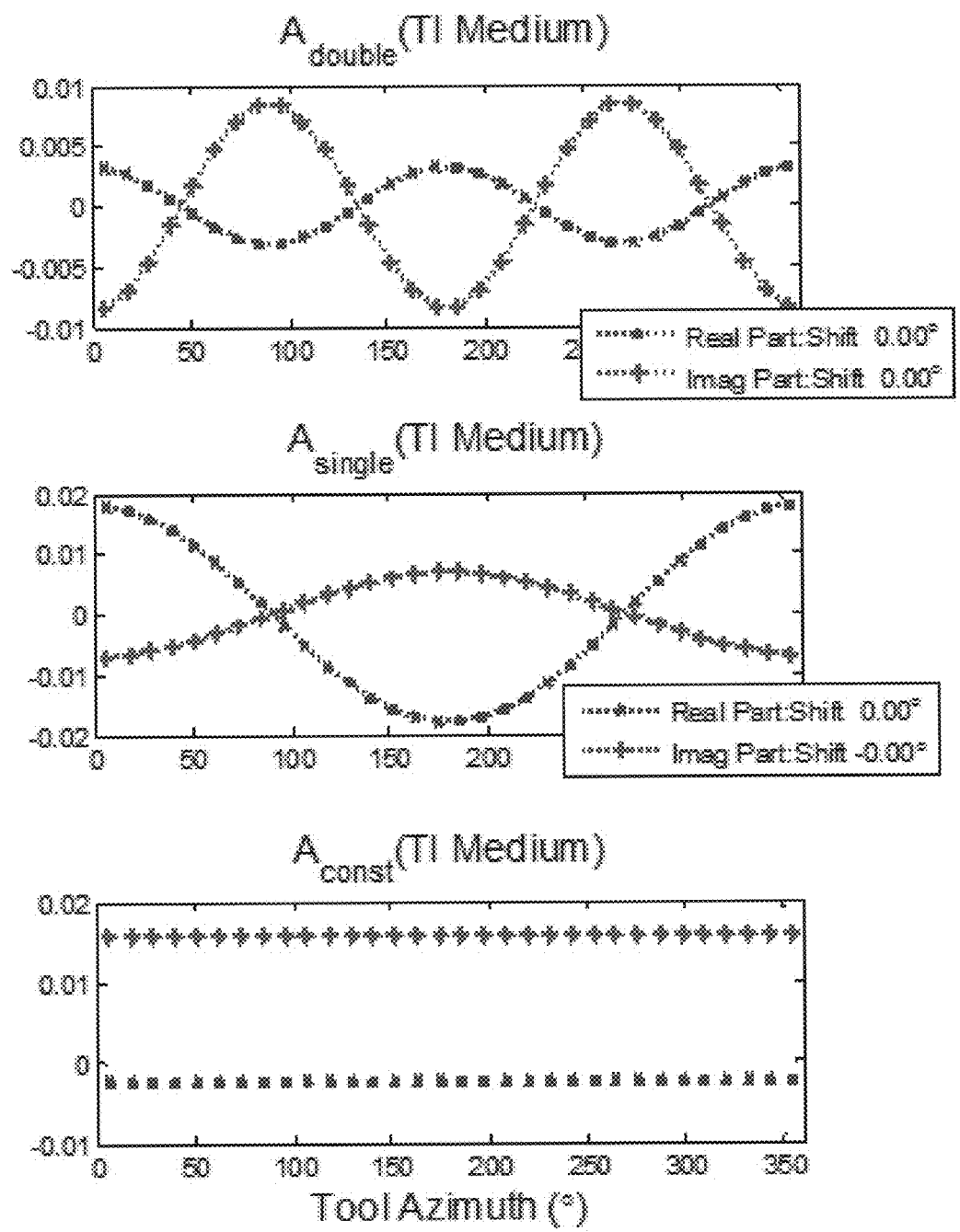
Figure 19:
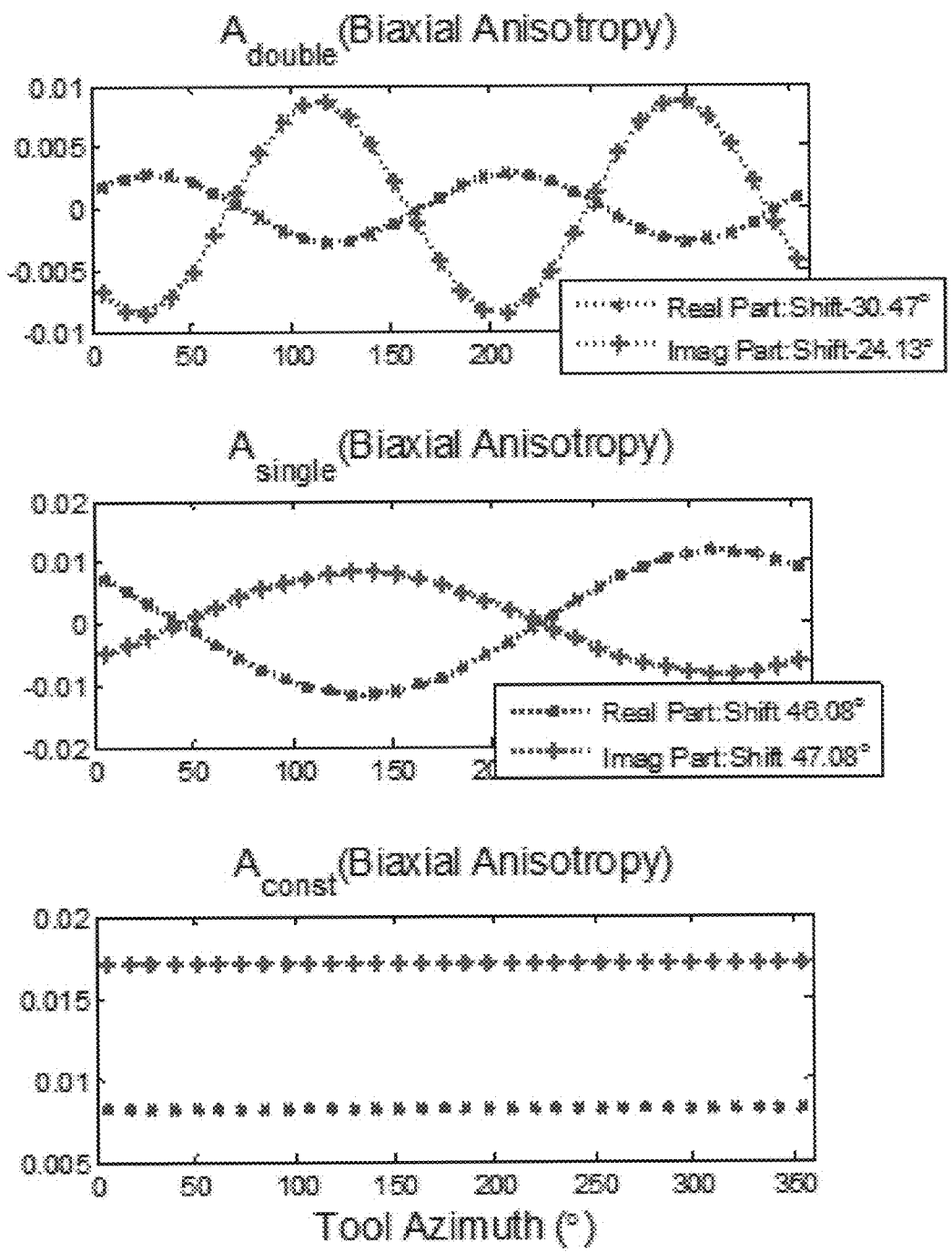

As can be seen in equations (8a), (8b) and (9), the real part and imaginary parts of each type of sinusoidal wave has an additional azimuth shift ($\beta_{DR}$, $\beta_{DI}$, $\beta_{SR}$, and $\beta_{SI}$) caused by the unconventional formation models. Further, the azimuth shift for the real part and the imaginary part vary on the basis of the unconventional formation model and measured multi-components in Eq. (6). Using the same spacing and operating frequency as FIGS. 12 and 13, FIGS. 18 and 19 illustrate tool azimuth spectra modeling responses for two different formation models. FIG. 18 illustrates a plot for a conventional TI formation model (Rh=0.25 Ω·m, Rv=2 Ω·m, relative dip angle of 20° and strike angle of 0°). FIG. 19 is a plot for an unconventional biaxial anisotropic formation model (Rhx=0.25 Ω·m, Rhy=1 Ω·m, Rv=2 Ω·m, relative dip angle of 20° and strike angle of 0°). As shown in FIG. 19, there are angle differences between azimuth shift in the real part as compared to the azimuth shift in the imaginary part for sinusoidal waves in unconventional formation model, especially for $A_{double}$. The true formation strike angle can be determined as described above for the azimuth spectra shown in FIG. 18. In contrast, however, because of the angle differences between the azimuth shift in the real and azimuth shift in the imaginary part, it is difficult to determine the true formation strike angle for the azimuth spectra shown in FIG. 19 using the techniques described above.

In one embodiment, unconventional formation signals are decoupled and unconventional formation model parameters are determined using the techniques described above. In one embodiment, several antenna configurations enable an LWD system to capture and invert data to produce unconventional formation parameters. In one embodiment, shown in FIG. 20, two sets of transmitter-receive antenna systems are used to decouple multi-components in a conventional formation model. In one embodiment, shown in FIG. 20, the two transmitters ($T_1$ and $T_2$) and the receiver ($R_x$) are oriented at the same tool azimuth, the transmitters are tilted at two different angles relative to the z-axis 2002 ($T_1$ at $\theta_{t1}$ and $T_2$ at $\theta_{t2}$), and the receiver ($R_x$) is tilted relative to the z-axis 2002 (at $\theta_r$).

Figure 20:
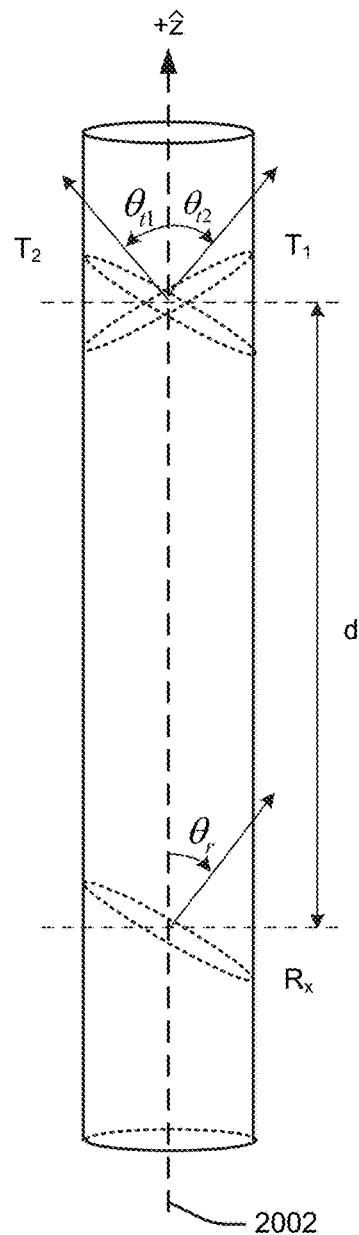
FIGS. 20-23 illustrate antenna arrangements.
Figure 21:
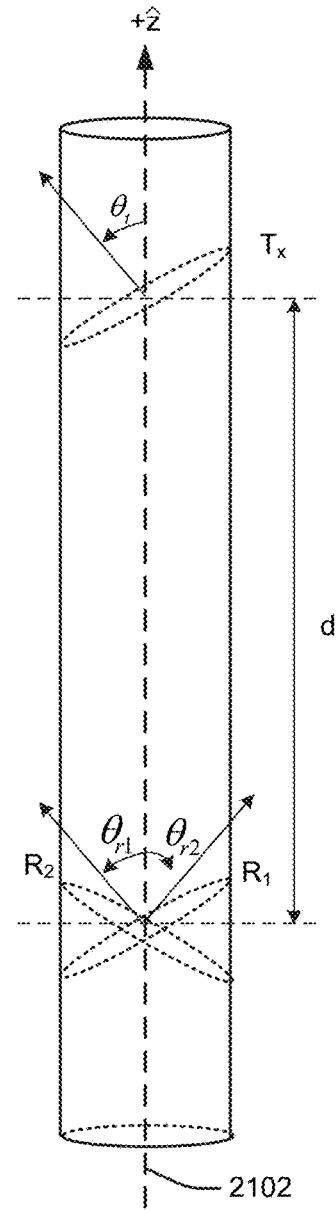

Under the reciprocity theorem, transmitter(s) and receiver(s) are exchangeable. FIG. 21 shows one embodiment of an antenna structure with similar functionalities as FIG. 20. Instead of two transmitters and one receiver as in FIG. 20, FIG. 21 shows two receivers ($R_1$ and $R_2$) and one transmitter ($T_1$). In one embodiment, shown in FIG. 21, the two receivers ($R_1$ and $R_2$) and the transmitter ($T_x$) are oriented at the same tool azimuth, the receivers are tilted at two different angles relative to the z-axis 2102 ($R_1$ at $\theta_{r1}$ and $R_2$ at $\theta_{r2}$), and the transmitter ($T_x$) is tilted relative to the z-axis 2102 (at $\theta_t$).

While the systems shown in FIGS. 20 and 21 are able to capture the unconventional formation signals, the received LWD measurements with only single frequency operation are not enough to decouple such formation parameters. Consequently, multi-frequency measurements are included with the systems in FIGS. 20 and 21 to allow unconventional formation determination.

Figure 22:
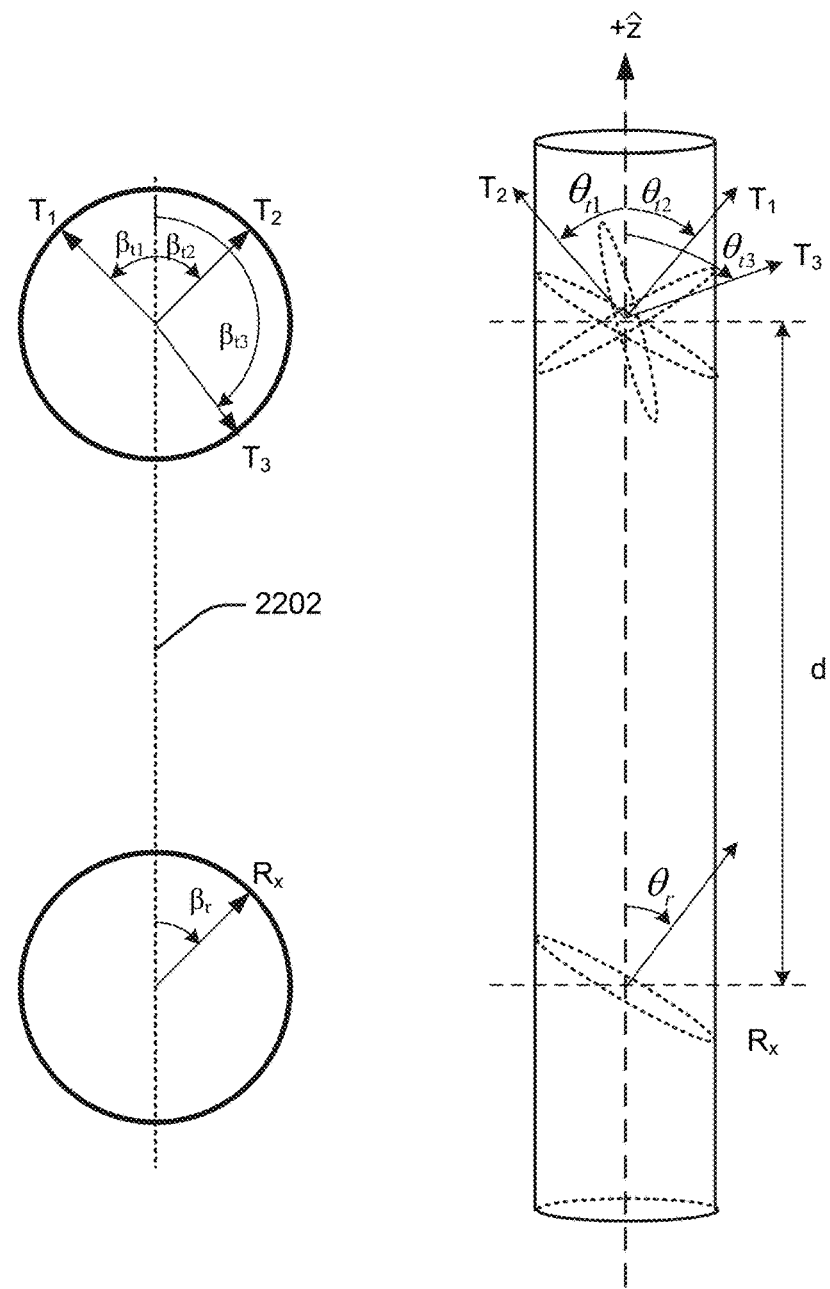
Figure 23:
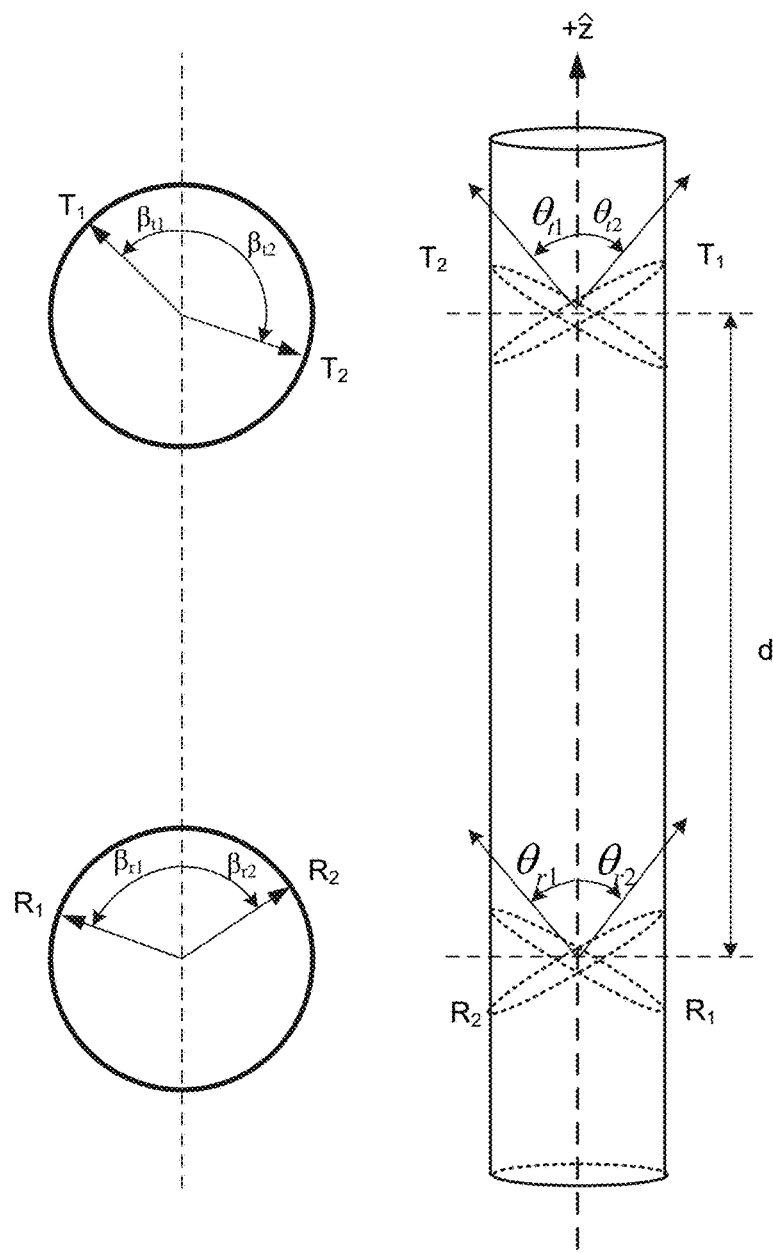

FIGS. 22 and 23 show antenna structures capable of capturing and decoupling unconventional formation signals with measurements received at single operation frequency. In embodiments illustrated FIGS. 22 and 23, at least three sets of transmitter-receiver system are included where each antenna orientation is tilted at a certain angle and oriented at a certain azimuth. With additional introduction of different antenna azimuth, measurements from the embodiments of systems illustrated in FIGS. 22 and 23 are able to capture and invert unconventional formation parameters.

In one embodiment illustrated in FIG. 22, one transmitter ($T_1$) is oriented at a different azimuth ($\beta_{t1}$) relative to strike angle 2202 compared to the orientation of the other two transmitters (i.e., $T_2$ at $\beta_{t2}$ and $T_3$ at $\beta_{t3}$, $\beta_{t1} \neq \beta_{t2}$ and $\beta_{t1} \neq \beta_{t3}$). In one embodiment, $T_2$ and $T_3$ are at the same azimuth (i.e., $\beta_{t2}=\beta_{t3}$) but at different tilt angles (i.e., $\theta_{t2} \neq \theta_{t3}$). In one embodiment, the receiver (Rx) is tilted at angle $\theta_r$ and is orientated at azimuth angle $\beta_r$.

In one embodiment, the receivers and transmitters in FIG. 22 are exchanged.

In one embodiment illustrated in FIG. 23, every transmitter and receiver oriented at different azimuth angle and at least one transmitter and one receiver is tilted.

In one practical embodiment using the system illustrated in FIG. 22, $R_x$ is tilted at $\theta_r=45°$ and oriented at azimuth of $\beta_r=0°$ and three receivers are all tilted at $\beta_{t1}=\beta_{t2}\beta_{t3}=45°$ but oriented at various azimuth angles ($\theta_{t1}=0°$, $\theta_{t2}=120°$, and $\theta_{t3}=240°$, respectively).

Figure 24:
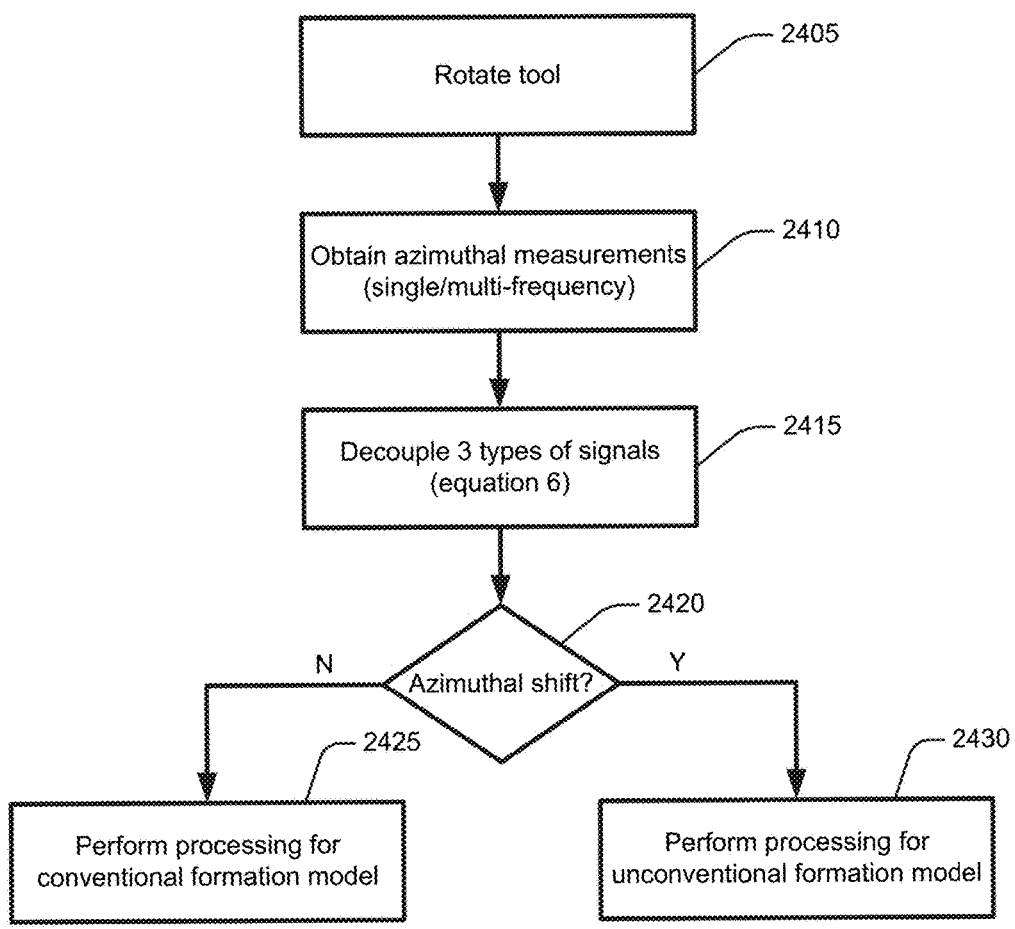
FIG. 24 is a flow chart.

In one embodiment of use, illustrated in FIG. 24, the tool 26 is rotated (block 2405). For example, in one embodiment the tool 26 is an LWD tool and the tool 26 is rotated as part of the drilling operation. In one embodiment, another scheme is used to rotate the tool in a wireline environment.

In one embodiment, single and/or multiple-frequency azimuthal measurements are made and binned (block 2410). In one embodiment, the three types of signals (equations 7(a), 7(b), and 7(c)) are decoupled using equation (6) (block 2415). In one embodiment, $A_{double}$ and/or $A_{single}$ are examined for the type of phase shift described above that indicates the samples were taken from an unconventional formation (block 2420). If the phase shift is not present, the data is processed, for example by applying one or more inversion techniques appropriate to conventional formations to extract formation parameters)(block 2425). If the phase shift is present, the data is processed, for example by applying one or more inversion techniques appropriate to unconventional formations to extract formation parameters (block 2430).

Figure 25:
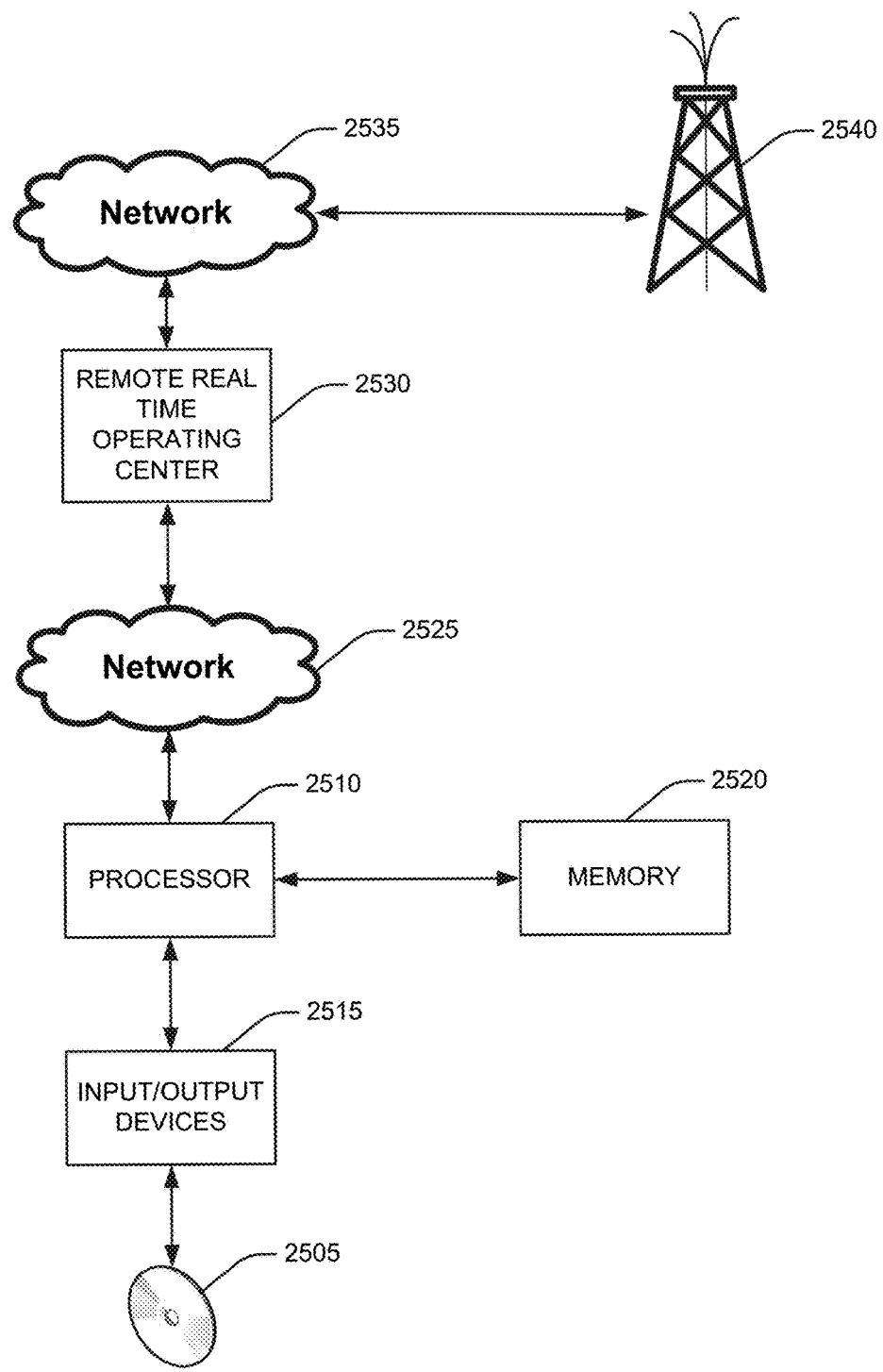
FIG. 25 illustrates an environment.

In one embodiment, shown in FIG. 25, the control module 602 (FIG. 6) is controlled by software in the form of a computer program on a non-transitory computer readable media 2505, such as a CD, a DVD, a USB drive, a portable hard drive or other portable memory. In one embodiment, a processor 2510, which may be the same as or included in the control module 602, reads the computer program from the computer readable media 2505 through an input/output device 2515 and stores it in a memory 2520 where it is prepared for execution through compiling and linking, if necessary, and then executed. In one embodiment, the system accepts inputs through an input/output device 2515, such as a keyboard or keypad, mouse, touchpad, touch screen, etc., and provides outputs through an input/output device 2515, such as a monitor or printer. In one embodiment, the system stores the results of calculations in memory 2520 or modifies such calculations that already exist in memory 2520.

In one embodiment, the results of calculations that reside in memory 2520 are made available through a network 2525 to a remote real time operating center 2530. In one embodiment, the remote real time operating center 2530 makes the results of calculations available through a network 2535 to help in the planning of oil wells 2540 or in the drilling of oil wells 2540.

The word "coupled" herein means a direct connection or an indirect connection.

The text above describes one or more specific embodiments of a broader invention. The invention also is carried out in a variety of alternate embodiments and thus is not limited to those described here. The foregoing description of an embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method comprising:
   obtaining signal measurements collected by azimuthally sensitive electromagnetic logging tool as a function of position in a borehole;
   identifying directly from the signal measurements, without first performing an inversion of the signal measurements, a formation model having a first resistivity profile in a first direction, a second resistivity profile in a second direction orthogonal to the first direction, and a third resistivity profile in a third direction orthogonal to the first direction and the second direction, wherein the first resistivity profile is not the same as the second resistivity profile and the third resistivity profile is not the same as the first resistivity profile or the second resistivity profile;

applying an inversion technique appropriate to the identified formation model to the set of signal measurements to determine a geophysical property;

using the geophysical property to make a decision regarding drilling a well;

wherein using the signal measurements to identify a type of formation model comprises:

decoupling a signal, having a real part that varies with azimuth and an imaginary part that varies with azimuth, from the signal measurements, and determining that a phase shift exists between the real part of the signal and the imaginary part of the signal and, as a result, identifying the type of formation model as an unconventional formation model; and wherein decoupling the signal comprises:

decoupling a double frequency signal, and decoupling a single frequency signal; and wherein the double frequency signal has twice the periods of the single frequency signal in 360° of azimuth.

2. The method of claim 1, wherein obtaining signal measurements comprises obtaining $V_R^T(\beta_i)$ at a plurality of positions in the borehole, where $\beta_i$ is an azimuthal direction from which the electromagnetic logging tool obtains the signal measurements.

3. The model of claim 1, wherein applying the inversion technique appropriate to the type of formation model comprises:

applying an inversion technique appropriate to an unconventional formation model.

4. The model of claim 1, wherein obtaining signal measurements comprises:

equipping the electromagnetic logging tool with A tilted transmitters and B tilted receivers, A+B=3, the tilted transmitters and tilted receivers being oriented to a same tool azimuth angle; and transmitting and receiving signals having multiple frequencies through the tilted transmitters and tilted receivers.

5. The model of claim 1, wherein obtaining signal measurements comprises:

equipping the electromagnetic logging tool with A tilted transmitters and B tilted receivers, A+B>3, at least one of the tilted transmitters and tilted receivers being oriented to a different tool azimuth angle than the tool azimuth angles to which the other tilted transmitters and tilted receivers are oriented; and transmitting and receiving signals having at least a single frequency through the tilted transmitters and tilted receivers.

6. A computer program stored in a non-transitory computer readable storage medium, the program comprising executable instructions that cause a computer to:

obtain signal measurements collected by azimuthally sensitive electromagnetic logging tool as a function of position in a borehole;

identify directly from the signal measurements, without first performing an inversion of the signal measurements, a formation model having a first resistivity profile in a first direction, a second resistivity profile in a second direction orthogonal to the first direction, and a third resistivity profile in a third direction orthogonal to the first direction and the second direction, wherein the first resistivity profile is not the same as the second resistivity profile and the third resistivity profile is not the same as the first resistivity profile or the second resistivity profile;

apply an inversion technique appropriate to the identified formation model to the set of signal measurements to determine a geophysical property;

use the geophysical property to make a decision regarding drilling a well;

wherein, when using the signal measurements to identify a type of formation model, the computer:

decouples a signal, having a real part that varies with azimuth and an imaginary part that varies with azimuth, from the signal measurements, and determines that a phase shift exists between the real part of the signal and the imaginary part of the signal and, as a result, identifies the type of formation model as an unconventional formation model;

wherein, when decoupling the signal, the computer:

decouples a double frequency signal, and decouples a single frequency signal; and wherein the double frequency signal has twice the periods of the single frequency signal in 360° of azimuth.

7. The computer program of claim 6, wherein, when obtaining signal measurements, the computer obtains $V_R^T(\beta_i)$ at a plurality of positions in the borehole, where $\beta_i$ is an azimuthal direction from which the electromagnetic logging tool obtains the signal measurements.

8. The computer program of claim 6, wherein, when applying the inversion technique appropriate to the type of formation model, the computer:

applies an inversion technique appropriate to an unconventional formation model.

9. The computer program of claim 6, wherein:

the electromagnetic logging tool is equipped with A tilted transmitters and B tilted receivers, A+B=3, the tilted transmitters and tilted receivers being oriented to a same tool azimuth angle, and, when obtaining signal measurements, the computer:

transmits and receives signals having multiple frequencies through the tilted transmitters and receivers.

10. The computer program of claim 6, wherein:

the electromagnetic logging tool is equipped with A tilted transmitters and B tilted receivers, A+B>3, at least one of the tilted transmitters and tilted receivers being oriented to a different tool azimuth angle than the tool azimuth angles to which the other tilted transmitters and tilted receivers are oriented, and, when obtaining signal measurements, the computer:

transmits and receives signals having at least a single frequency through the tilted transmitters and receivers.

11. An apparatus comprising:

a plurality of antennas mounted in a tool housing; and a processor to:

obtain signal measurements collected by the plurality of antennas as a function of position in a borehole;

identify directly from the signal measurements, without first performing an inversion of the signal measurements, a formation model having a first resistivity profile in a first direction, a second resistivity profile in a second direction orthogonal to the first direction, and a third resistivity profile in a third direction orthogonal to the first direction and the second direction, wherein the first resistivity profile is not the same as the second resistivity profile and the third resistivity profile is not the same as the first resistivity profile or the second resistivity profile;
apply an inversion technique appropriate to the identified formation model to the set of signal measurements to determine a geophysical property;
use the geophysical property to make a decision regarding drilling a well;
wherein using the signal measurements to identify a type of formation model comprises:
decoupling a signal, having a real part that varies with azimuth and an imaginary part that varies with azimuth, from the signal measurements, and
determining that a phase shift exists between the real part of the signal and the imaginary part of the signal and, as a result, identifying the type of formation model as an unconventional formation model; and
wherein decoupling the signal comprises:
decoupling a double frequency signal, and
decoupling a single frequency signal; and
wherein the double frequency signal has twice the periods of the single frequency signal in 360° of azimuth.

12. The apparatus of claim 11, wherein the plurality of antennas comprises:
A tilted transmitters and B tilted receivers, A+B=3, the tilted transmitters and tilted receivers being oriented to a same tool azimuth angle.

13. The apparatus of claim 12, further comprising:
a transmitter for transmitting multiple frequencies through the tilted transmitters; and
a receiver for receiving the multiple frequencies through the tilted receivers.

14. The apparatus of claim 11 wherein the plurality of antennas comprises:
A tilted transmitters and B tilted receivers, A+B>3, at least one of the tilted transmitters and tilted receivers being oriented to a different tool azimuth angle than the tool azimuth angles to which the other tilted transmitters and tilted receivers are oriented.

15. The apparatus of claim 14, further comprising:
a transmitter for transmitting signals having at least a single frequency through the tilted transmitters; and
a receiver for receiving signals having at least the single frequency through the tilted receivers.

* * * * *